Patented Mar. 14, 1944

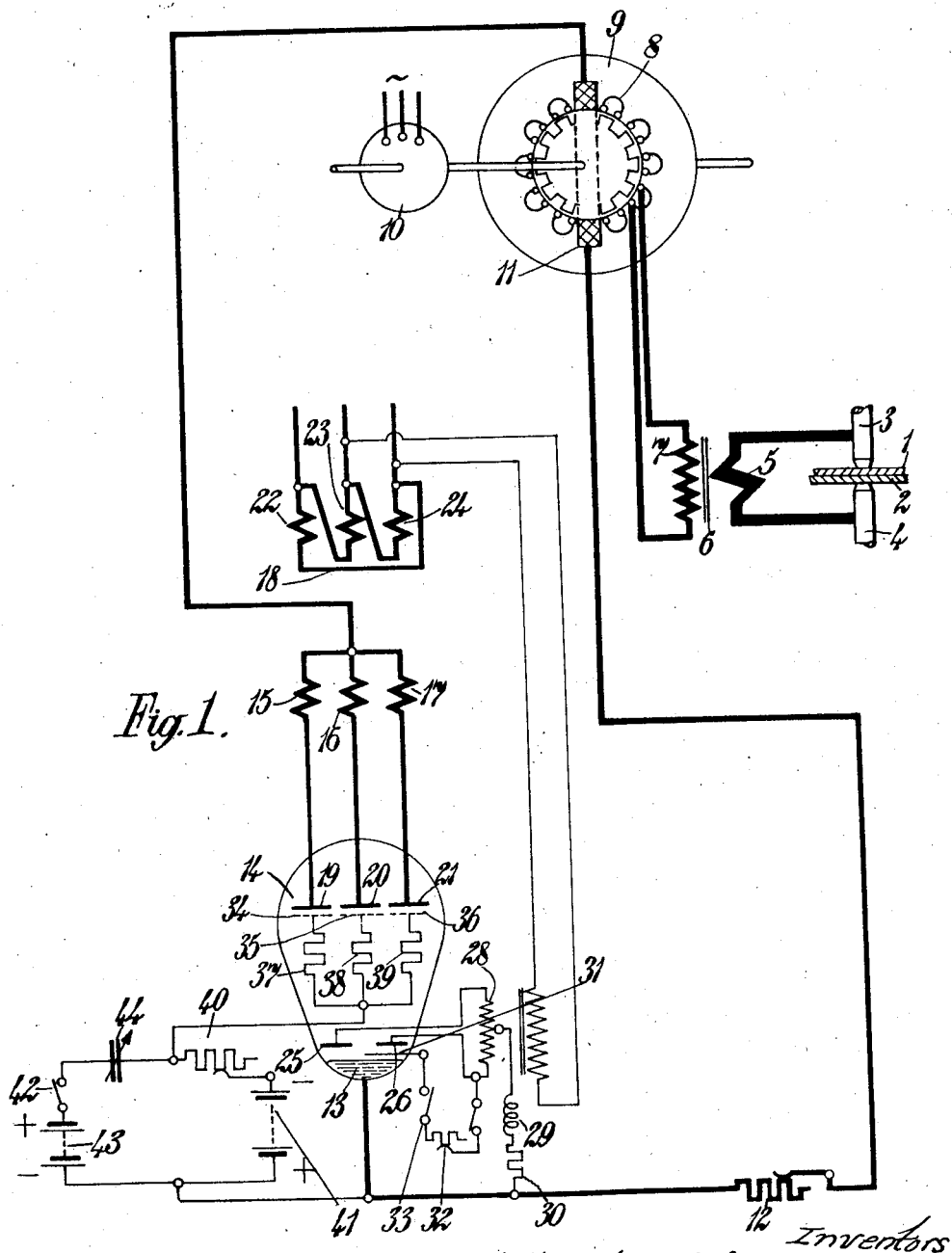

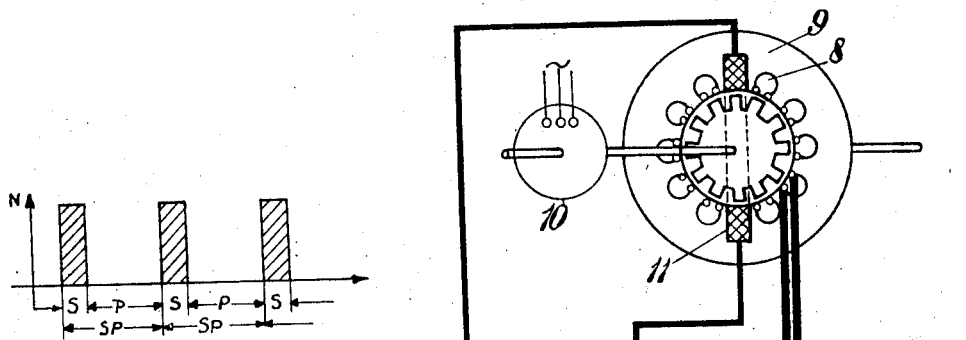
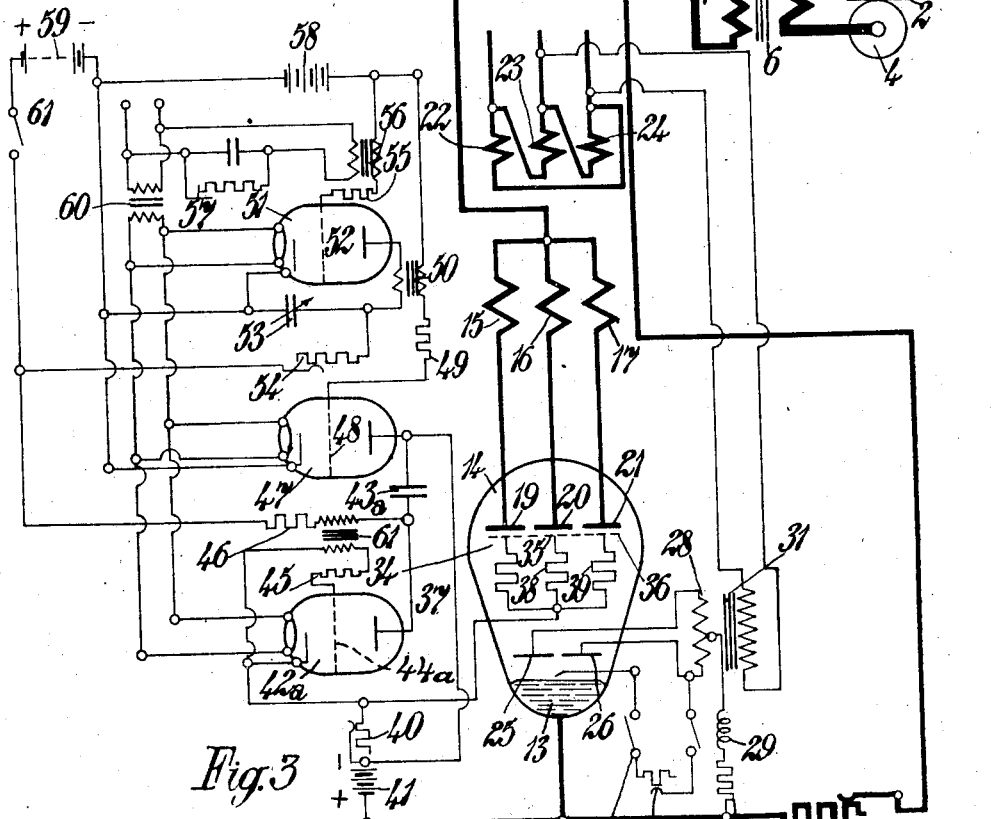

2,344,086

UNITED STATES PATENT OFFICE 2,344,086

WELDING CONTROL SYSTEM

Gerhard Hagedorn, Berlin-Lichterfelde, Erwin Luxer, Berlin-Südende, and Ernst-Günther Wahl, Berlin-Steglitz, Germany; vested in the Alien Property Custodian Original application June 14, 1939, Serial No. 279,218, now Patent No. 2,234,117, dated March 4, 1941. Divided and this application February 4, 1941, Serial No. 377,407. In Germany June 18, 1938

2 Claims. (Cl. 171—119)

The present invention pertains to means for controlling the duration of welding currents and this application is a division of our application Serial No. 279,218, filed June 14, 1939, which has issued as Patent Number 2,234,117, dated March 4, 1941.

The present invention relates to apparatus wherein use is made of a time switch consisting of one or more grid-controlled gas or vapor discharge tubes which are inserted in the excitation circuit of the medium or high frequency current generator feeding a medium or high frequency welding transformer. The contacts of the mechanical switches are arranged in the grid-controlled circuits of the tubes and, owing to the small switching power of these circuits, there is not produced any substantial electric arcing or burning, so that even energy impulses of very short duration can be accurately determined. In this way the speed of the variation of the generator field becomes of increased importance, more particularly in the case of light metal spot and seam welding, since it is the speed which sets a limit to the shortening of the duration of the energy in the case of full generator power.

In carrying out the invention use is preferably made of a source of alternating current voltage for the excitation of the medium or high frequency generator and of a gas or vapor discharge tube for the time switch. It is an advantage to use for the switching on or off of the alternating current circuit of the excitation of the medium or high frequency current generator one or more grid-controlled gas or vapor discharge tubes, in which one or more auxiliary electric arcs are employed. The switching on of the exciting current circuit is effected by applying a positive voltage to the grid, and a switching off thereof is effected by applying a negative voltage to the grid.

In the arrangement according to the present invention, only a small fraction of power has to be switched on and off. More particularly the switching tube is very small, so that the welding apparatus can easily be transported. Moreover, by the means described, medium and high frequency currents can be indirectly switched on and off, which can be carried out with the known welding timing arrangements, only up to a few hundred cycles per second. The use of higher frequency means that a smaller and lighter welding transformer can be employed, which can in many cases then be brought nearer to the welding point, whereby a further economy in power is effected. The simplicity of this new arrangement will be apparent from the diagram of connections.

Referring to the accompanying drawings, the invention is illustrated by way of example in which:

Fig. 1 is a diagram of connections of an electrical welding installation comprising a medium or high frequency welding generator excited from a source of alternating current through a rectifier serving at the same time as a switch;

Fig. 2 illustrates the welding operation; and

Fig. 3 shows a diagram of connections of spot and seam welding apparatus.

The drawings show a medium or high frequency impulse generator used in a resistance welding installation, in which the magnetic circuits are constituted throughout by laminated iron, and in which the excitation current is derived from a source of alternating current voltage.

Fig. 1 illustrates an arrangement which is used when alternating current voltage is available for the excitation. The two electrodes 3 and 4 rest on two metal sheets 1 and 2 to be welded together. The electrodes are connected to the secondary winding 5 of a welding transformer 6. The primary winding 7 carrying the higher voltage is connected to the armature winding 8 of the welding generator 9 driven by the motor 10.

The excitation winding 11 of the welding generator 9 which is provided throughout with magnetic circuits constituted by laminated iron is connected through a resistance 12 with one end to the cathode 13 of a discharge tube 14, and at the other end to the star point of the secondary windings 15, 16 and 17 of a transformer 18, such as a three-phase transformer. The other ends of the secondary winding lead to the three anodes 19, 20 and 21 of the discharge tube 14. The primary windings 22, 23 and 24 of the transformer 18 are connected either to an existing three-phase network or to a three-phase generator which may be mechanically coupled to the driving motor 10.

Two auxiliary anodes 25 and 26 of the tube 14 are used for auxiliary electric arcs which are fed by the lower voltage winding of the auxiliary transformer 28. The tapping on the lower voltage winding is connected through an auxiliary discharge circuit cathode choke 29 and through a regulating resistance 30 to the cathode 13 of the discharge tube 14. In order to start the auxiliary electric arcs use may be made of a starting pin 31, which is connected through a regulating resistance 32 and switch 33 at one of the two ends of the lower voltage winding of the auxiliary transformer 28.

The three controlling grids 34, 35 and 36 are connected through grid resistances 37, 38 and 39 and the regulating resistance 40 connected to the source of grid voltage 41 so as to be biased to a stopping potential which is negative with respect to the cathode. The positive terminal of the source of grid voltage is connected to the cathode 13 of the discharge tube 14.

If the main discharge is to be started and the welding generator 9 be thereby excited, the switch 42 is operated, whereby a circuit is closed which includes a positive terminal of the source of grid voltage 43, an adjustable condenser 44, the regulating resistance 40, negative terminal of the source of grid voltage 41, positive terminal of the source of grid voltage 41, negative terminal of the source of grid voltage 43. At the first moment the voltage on the condenser 44 is nil, whereby the grids 34, 35 and 36 are operated beyond the limit of grid voltage in a positive direction, thus starting the main discharge in the tube 14 ionised by the auxiliary electric arc. As soon as the voltage on the condenser 44 has increased to such an extent that the grid voltage drops again below the value of the limit of the grid voltage, the discharge no longer takes place towards the anode of the next following phase but is extinguished at the anode which was last operated in the next following passage of current. By varying the capacity 44 or the resistance 40 control of the duration of the main discharge and thereby the period of welding can be obtained.

Referring to Fig. 2, the hatched surfaces show the energy impulses serving for the welding, and the abscissae represent time. The duration of the impulse is indicated at S and P is the duration of the interval between the individual energy impulses. One operation is represented by SP. In the present spot and seam welding apparatus the duration S of the energy impulse and the duration of one operation SP are regulated by purely electrical means.

Fig. 3 shows the diagram of connections of a spot and seam welding apparatus, the reference numerals 1 to 41 referring to the same parts as those described with reference to Fig. 1. The regulating device for the regulation of the duration S of the energy impulse and of the duration of one operation SP consists of a tube switching arrangements of three tubes 42a, 47 and 51, of which 51 and 47 are gas-filled and 42a is an electron tube having a very steep anode current characteristic. The tube 51 together with the resistance 54 and the condenser 53 constitute a saw-oscillation circuit. Apart from the voltage of the source of current 59, the saw-oscillation voltage is dependent on the starting voltage of the tube 51 and, therefore, on the grid voltage 52 of this tube. This grid voltage 52 is composed of the voltages of the transformer 56 and battery 58. Owing to saturation the transformer 56 has a voltage curve which is very pointed. The battery voltage 58 is made so strongly negative that the tube 51 starts only when the condenser 53 is charged to the voltage of the source of current 59 and when the voltage of the transformer 56 attains its maximum positive value. In this way it is attained that the tube 51 always starts at a definite moment with respect to the alternating current voltage of the network. This starting moment is preferably so chosen by means of a capacity resistance circuit 57, that a grid of the main rectifier 14 becomes positive exactly when the voltage at the corresponding anode passes through zero at the beginning of the positive half wave.

As soon as the tube 51 starts after the closing of the switch 61 in the manner described, the discharge current of the condenser 53 flows through the transformer 50 through which the grid 48 of the tube 47 is coupled to the saw-oscillation circuit. Normally the grid 48 is made so negative that no current flows through the tube 47. During the discharge in the saw-oscillation circuit the grid 48 becomes positive and a current flows from the positive pole of the battery 59 through the resistance 46, transformer 61, condenser 43a and tube 47 back to the negative terminal of the battery 59 and the condenser 43a is charged. During the flow of current through the coupling transformer 61, the grid 44a of the tube 42a becomes negative and the tube 42a is thus stopped. As soon as the charging of the condenser 43a is terminated the grid 44a of the tube 42a is again de-energized, and the condenser 43a is discharged through the resistance 40 and tube 42a. Owing to the voltage drop on the resistance 40, the grids 34, 35 and 36 of the main rectifier 14, which are otherwise negatively charged by the battery, become positive and the main rectifier starts and is operative until the grids 34, 35 and 36 become again negative after the discharge of the condenser 43a.

The operation hereinbefore described is repeated in the tempo of the saw-oscillation frequency of the first tube circuit, which frequency can be regulated by means of the resistance 54 and condenser 53. The ignition time of the rectifier 14 is determined by the time constant of the circuit constituted by the resistance 40 and condenser 43a. The saw-oscillation frequency determines the period of operation and the ignition time the duration of the energy impulse. Thus the arrangement described permits of the impulse and duration of operation to be regulated and periodically repeated by purely electrical means.

While the invention is described with reference to specific circuits and particular tubes it will be appreciated that changes may be made therein by those skilled in the art. Such modification may be made without departing from the spirit and scope of the invention as set forth in the appended claims.

We claim:

1. A welding control system comprising, a welding transformer, a relatively high frequency generator supplying current to said transformer, a field winding for said generator, a source of alternating current and a circuit for exciting said field winding, a gaseous discharge tube having a cathode and an anode connected in said circuit for controlling the excitation of said generator, an auxiliary anode in said tube, an auxiliary transformer connected to said alternating current source, means connecting said auxiliary anode to said transformer for establishing an auxiliary discharge between the cathode and the auxiliary anode, a grid in said tube, a grid circuit including a condenser and means for charging said condenser to bias said grid positively with respect to said cathode, and a source of direct current associated with said grid circuit for biasing the grid negatively with respect to the cathode.

2. A welding control system comprising in combination, a welding transformer, a relatively high frequency generator supplying current to said transformer, a field winding for said generator, a source of alternating current and a circuit for exciting said field winding, a gaseous discharge tube having a cathode and an anode connected in said circuit for controlling the excitation of said generator, a grid in said tube, a grid circuit including a source of direct current for biasing the grid negatively with respect to the cathode, a second source of direct current, an auxiliary circuit connecting said second source of direct current across said first direct current source, an adjustable condenser in said auxiliary circuit, and means for opening and closing said auxiliary circuit.

GERHARD HAGEDORN.
ERWIN LUXER.
ERNST-GÜNTHER WAHL.